Sept. 15, 1953　　　D. G. GUMPERTZ ET AL　　　2,652,551

PARKING METER

Filed Dec. 23, 1950　　　　　　　　　　　　　5 Sheets-Sheet 1

INVENTORS.
DONALD G. GUMPERTZ
RUSSEL C. ALEXANDER
BY

ATTORNEYS.

Sept. 15, 1953     D. G. GUMPERTZ ET AL     2,652,551
PARKING METER

Filed Dec. 23, 1950     5 Sheets-Sheet 2

INVENTORS.
DONALD G. GUMPERTZ
RUSSEL C. ALEXANDER
BY

ATTORNEYS.

INVENTORS.
DONALD G. GUMPERTZ.
RUSSEL C. ALEXANDER
BY
ATTORNEYS.

Sept. 15, 1953  D. G. GUMPERTZ ET AL  2,652,551
PARKING METER
Filed Dec. 23, 1950  5 Sheets-Sheet 4

INVENTORS.
DONALD G. GUMPERTZ
RUSSEL C. ALEXANDER
BY
ATTORNEYS.

INVENTORS.
DONALD G. GUMPERTZ.
RUSSEL C. ALEXANDER
BY

ATTORNEYS.

Patented Sept. 15, 1953

2,652,551

UNITED STATES PATENT OFFICE 2,652,551

PARKING METER

Donald G. Gumpertz, North Hollywood, and Russel C. Alexander, Long Beach, Calif., assignors, by mesne assignments, to M & M Manufacturing Corporation, a corporation of Colorado Application December 23, 1950, Serial No. 202,533

14 Claims. (Cl. 340—51)

This invention relates to parking meters and has particular reference to a resetting mechanism for returning the time indicator of a parking meter to a zero reading whenever a parked vehicle is moved out of the parking area associated with such parking meter.

Although numerous parking meters have been devised and used in the past, the majority of these devices have the disadvantage that they do not return to a zero reading until the expiration of a predetermined time interval. Thus, the operator of a vehicle may deposit a coin in such meter for perhaps a one-hour parking period, and use only a small fraction of that time, with the result that other motorists may drive into the vacated stall or parking area and use the balance of the time on the meter without the payment of any parking fee. As the use of parking meters is a means of both controlling parking and raising revenue for a municipality, it will be apparent that the revenue may be increased considerably if the parking meter may be returned to a zero reading immediately the parking stall is vacated, so that the next motorist is compelled to pay the usual parking fee.

The timing devices used on conventional parking meters are usually driven by a clockwork mechanism, the mainspring of which requires periodic winding. In one type of meter, arrangements are made for periodic windings of the clock mainspring by policemen or other employees of the municipality. The cost of keeping the parking meters wound is material, and a considerable increase in the net revenue taken by the parking meter can be realized by the elimination of the requirement for winding the clock spring.

In other types of parking meters, the motorists, upon the deposit of a coin, are required to turn a key or handle in order to move the time indicator to the full sixty minutes paid. This key or handle is so connected to the spring of the clock as to at least partially wind the spring each time the handle is operated in the manner described. While this arrangement eliminates the cost of employees engaged to wind the parking meters, it introduces a further disadvantage which results from the fact that an appreciable fraction of drivers of automobiles have substantially no mechanical sense, and do not understand the manner of operation of the parking meters. These motorists, who would quite likely be willing to merely deposit a coin in a coin slot for the privilege of using the vacant parking space, usually drive to a free parking area or park their vehicles in a private parking lot or garage rather than attempt to unravel the mystery of the operation of the parking meter.

The successful and effective use of parking meters for the control of parking, and for the production of revenue for a municipality depends in large part upon the maintenance of a uniform and consistent policy of citing motorists for such violations of the parking ordinances as leaving their vehicles parked a longer time than the time paid for by the deposits of coins, or deliberately parking in a vacant stall without depositing coins to pay for the parking privilege. The policing of an extensive parking meter installation is an element of considerable cost in the maintenance of the system. Conventional parking meters employ a red mechanical flag which appears in the window area of the parking meter whenever the parking meter indicates a zero reading. In order to determine whether the parking ordinances have been violated, it is necessary for a policeman to patrol the entire installation in order to discover the individual violations. Since such patrolling is a time-consuming process, many violations remain undiscovered.

It is, therefore, an object of this invention to provide a parking meter which includes a resetting mechanism for resetting the time indicator of the meter to zero whenever the associated parking area is vacated.

It is also an object of this invention to provide a parking meter of the character set forth in the preceding paragraphs in which the resetting mechanism employs an electronic apparatus for sensing electrically the absence or presence of a vehicle in the parking area.

It is an additional object of this invention to provide a parking meter of the character set forth hereinbefore in which the electronic apparatus responds to changes in the mutual inductance between two inductance coils and resulting from the moving of a parked vehicle from the parking area.

It is another obect of this invention to provide a parking meter of the character set forth in the preceding paragraphs in which the electronic apparatus responds to changes in the capacitance of an electrical surface and resulting from the moving of a parked vehicle from the parking area.

It is a still further object of this invention to provide a parking meter of the character described hereinbefore in which the electronic apparatus responds to changes in the orientation of the earth's magnetic field and resulting from the moving of a parked vehicle from the parking area.

It is also an object of this invention to provide an apparatus of the character set forth in the preceding paragraph in which the changes in the orientation of the earth's magnetic field are used to induce a control potential in an inductance coil.

It is also an object of this invention to provide a parking meter of the character set forth in the preceding paragraphs in which the electronic apparatus responds to changes in the inductance of an electrical circuit and resulting from the moving of a parked vehicle from the parking area.

It is an additional object of this invention to provide a parking meter of the character set forth in the preceding paragraph in which the changes in inductance produce corresponding changes in the frequency of an alternating current signal.

It is also an object of this invention to provide an apparatus of the character set forth in the preceding paragraphs in which the changes in inductance change the balance conditions in an inductance bridge circuit.

It is a still further object of this invention to provide an electronic parking meter apparatus of the character hereinbefore described in which changes in inductance are used to change the "Q" of a tuned circuit.

It is another object of this invention to provide a parking meter of the character set forth in the preceding paragraphs which includes a spring winding mechanism operatively connected to the resetting mechanism for at least partially winding the clock spring of the parking meter timing device whenever the resetting mechanism is actuated.

It is also an object of this invention to provide a parking meter of the character set forth in the preceding paragraphs in which the electrical instrumentalities are arranged to be energized by local batteries, individually associated with the individual parking meters, and which includes means for periodically momentarily energizing the electronic apparatus to thereby materially extend the useful life of the batteries beyond the life to be expected were the apparatus energized continuously.

It is an additional object of this invention to provide a parking meter system using a plurality of individual parking meters, and in which each parking meter is electrically connected to a centrally located supervising station in such a way as to indicate at that center each violation of the parking ordinance.

It is another object of this invention to provide a parking meter system of the character set forth in the preceding paragraphs which includes a central totalizing system for indicating the total number of operations of all parking meters.

Other objects and advantages of this invention will be apparent from a consideration of the following specification, read in connection with the accompanying drawings, wherein.

Figures 1, 2:
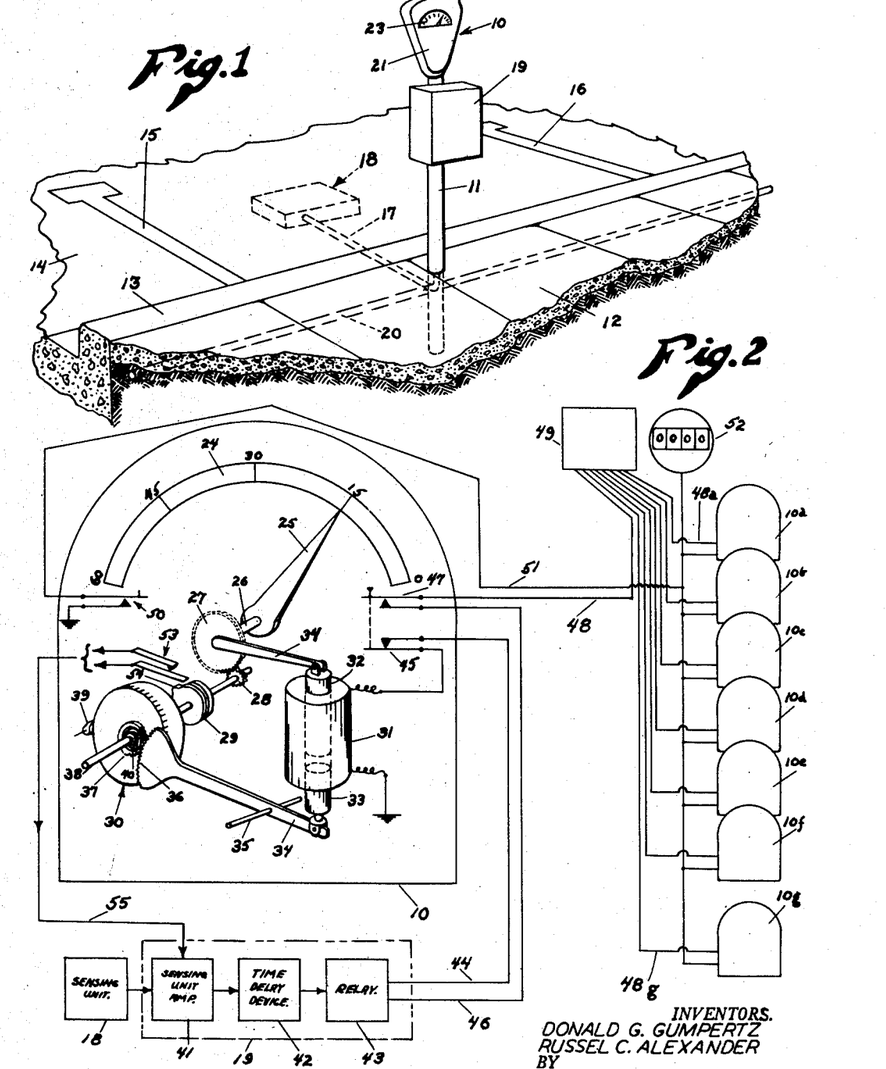
Figure 1 is a perspective view partly in section illustrating a typical parking meter installation employing the novel features of this invention.
Figure 2 is a diagrammatic view illustrating the construction of a parking meter and the resetting mechanism therefore and illustrating in block diagram form the control apparatus used for controlling the resetting mechanism, and illustrating further the manner of interconnecting each parking meter of a parking meter system with a violation indicator and a totalizer located at a central supervising station.

Referring to the drawings, there is illustrated in Figure 1 a more or less conventional parking meter installation. The parking meter proper, which is indicated generally by the reference character 10, is mounted upon a suitable standard or post 11, set into the ground or cast into the concrete of which the sidewalk 12 is usually formed. The standard 11 is customarily positioned near the curb 13, and the surface 14 of the roadway proper is painted or otherwise marked with lines 15 and 16 to define a stall or parking area associated with the parking meter 10.

In accordance with the present invention, the support or standard 11 is made of pipe or tubing so as to accommodate a conduit 17 used to connect a sensing element indicated generally at 18 with sensing and control mechanism mounted in a suitable housing 19 secured to the standard 11 and operatively connected with the mechanism of the parking meter 10 in a manner to be described hereinafter. The hollow standard 11 may also provide a connection with a conduit 20 which is used to interconnect all of the parking meters of a given system and for connecting such a plurality of parking meters to a centrally located supervisory station for purposes which will be made more apparent hereinafter.

As may be seen from Figures 1 and 2, the parking meter 10 comprises a housing 21 which is provided with a coin receiving aperture 22. Both faces of the housing 21 are provided with transparent windows 23, through which may be seen the time-indicating mechanism of the meter.

The time-indicating mechanism of the parking meter may comprise a dial (Figure 2) upon which is inscribed a scale 24 suitably marked in terms of time, as for example, by being marked in minutes. Conventionally, the parking time limit is set for sixty minutes, and the scale 24 normally extends from zero at the right-hand end thereof, to a sixty-minute mark at the left-hand end thereof. Time paid for, but not yet expired, is indicated on the scale 24 by means of a moving pointer 25. The pointer 25 is mounted upon a shaft 26 which is connected through gears 27, 28 and slip clutch 29 to a clockwork mechanism, indicated generally at 30. The clockwork mechanism 30 includes a clock spring used to drive the mechanism 30 and rotate the shaft 26 at a controlled speed such as to require sixty minutes for moving the pointer 25 from one limit of the scale 24 to the other.

Within the housing 21 there is mounted a solenoid coil 31 which is provided with two axially movable plungers 32 and 33. The upper plunger 32 is suitably connected as by means of a crank member 34 to the shaft 26, so that upon energization of the solenoid 31 and the resulting downward movement of the plunger 32, the shaft 26 will be rotated to a position such as to cause the pointer 25 to indicate zero on the scale 24. Such rotation of the shaft 26 is permitted by the slip clutch 29.

The lower plunger 33 is suitably connected to a lever 34 which is pivoted, as indicated at 35, and which has formed on the opposite end thereof a sector gear, as is shown at 36. The sector gear 36 meshes with a spur gear 37 secured to a winding shaft 38, rotation of which results in the winding of the mainspring of the clockwork 30. As is conventional, pawl and ratchet mechanisms 39 and 40 are used to permit a counter-rotation of the winding shaft 38 and to hold the spring in its then position during such counter-rotation. Thus, energization of the solenoid 31 not only resets the time indicator of the parking meter to zero, but at the same time winds, at least partially, the spring of the clockwork mechanism 30. This structure obviates the necessity of manual winding by employees of the municipality maintaining the parking meter system, and similarly eliminates the necessity of providing a handle or key for use by the driver of the parked vehicle in winding the meter and setting the dial.

It will be understood that parking meter 10 includes coin-collecting and control mechanism of conventional construction, operating in response to the deposit of the appropriate coin to immediately position the pointer 25 at the extreme left-hand end of the scale 24 so as to indicate the sixty minutes of parking time have been paid for. Such mechanism is not shown in the drawings of this application, being conventional and well known.

The apparatus for operating the solenoid 31 of the resetting mechanism is illustrated in block diagram form in Figure 2. The sensing unit 18 is connected to a sensing unit amplifier 41, preferably mounted within the housing 19 and serving to amplify to suitable amplitudes the electrical signals which are generated by the sensing unit 18. The amplifier 41 is connected through a time-delay device 42 to a relay 43. The relay 43 is operated in response to the signals generated by the sensing unit 18, and is connected, as is indicated at 44, through a normally closed limit switch 45 to the solenoid 31, so that operation of the relay 43 will energize the solenoid 31 to reset the parking meter to zero. The normally closed limit switch 45 is positioned in the path of movement of the pointer 25 so as to be opened when the pointer 25 reaches the zero position, thus deenergizing the solenoid 31 at the completion of the resetting operation.

The sensing unit 18 and the relay 43, are, in a number of the forms of the invention specifically described hereinafter, so arranged as to cause deenergization of the relay when a vehicle is parked in the parking stall, and so as to cause energization of the relay when the vehicle is removed therefrom. The relay 43 preferably includes a normally closed contact which is closed during the time a vehicle is parked in the parking stall. This contact is connected, as indicated at 46, through a normally open limit switch 47, and by means of a conductor 48 to an annunciator panel 49 preferably positioned at a suitably located central supervisory station. It will be seen that the appropriate indicator on the annunciator 49 will be energized wherever the limit switch 47 is closed during the time a vehicle is parked in the parking stall. Since the limit switch 47 is closed whenever the time indicator of the parking meter indicates zero time, the completion of this circuit is representative of the beginning of a period of violation of the parking ordinances, and such fact is registered by the annunciator 49.

A complete parking system is conceived to include a plurality of parking meters, such as are represented in Figure 2 by the reference characters 10 and 10a—10g. Each of the additional meters 10a—10g is connected by individual conductors 48a—48g to the annunciator 49 so that a violation registered by any one of the parking meters 10a—10g will produce a corresponding indication on the centrally located annunciator panel 49.

A normally open limit switch 50 is similarly positioned at the extreme left-hand end of the scale 24 so as to be momentarily closed by the movement of the pointer 25 upon the deposit of a coin in the coin-collecting mechanism. The limit switch 50 is connected in an operative circuit, as is indicated at 51, to a counter or totalizer 52 preferably positioned at the central supervisory station along with the annunciator panel 49. As is indicated in Figure 2, the other parking meters 10a—10g of the complete installation are similarly connected to the totalizer 52. The totalizer 52 may comprise any conventional electrically operated counting mechanism, and operates by the periodic momentary closing of the limit switches 50 to register each individual operation of each of the parking meters comprising the entire system, and to indicate the total number of such operations.

In certain cases, it may be desirable to provide for battery operation of the various electrical instrumentalities employed in the parking meters of this invention. It would be preferable, for example, to use batteries as a primary source of power where installation conditions would make prohibitive the cost of supplying commercial electric power to each of the individual parking meters. When battery powered instrumentalities are employed, the batteries are preferably mounted within the housing 19.

In order to obtain the maximum possible useful life from a given set of batteries, this invention contemplates the provision of a mechanism for momentarily energizing the sensing unit 18 and sensing unit amplifier 41 at regular periods. By this means, the life of the batteries is greatly extended because current is drawn from the batteries only during the short periods of momentary energization. The resetting mechanism will be actuated in the manner described at the time of the first momentary energization following the removal of the parked vehicle from the parking area.

The described intermittent energization of the sensing unit 18 and sensing unit amplifier 41 may be effected by means of a switch mechanism 53 which is mounted within the housing 21 of the parking meter head. The switch 53 is of the normally open type, and is positioned to be periodically actuated by a cam lobe 54 secured to or formed integrally with the driving half of the slip clutch 29. The cam lobe 54 engages one of the members of the switch 53 so as to close the switch during the fraction of each revolution of the clutch member 29 during which the cam lobe 54 engages the switch. If a twelve-to-one drive ratio is provided by the gears 27, 28, the cam lobe 54 will be rotated approximately once every twelve minutes. If it is desired to close the switch 53 at more frequent intervals, a higher drive ratio may be provided by the gears 27, 28; or alternatively, a plurality of cam lobes 54 may be spaced about the periphery of the clutch member 29.

The connection of the momentary switch 53 to the sensing unit amplifier is illustrated diagrammatically at 55 in Figure 2. The precise electrical circuitry employed in this connection is hereinafter described in detail with reference to Figure 5.

Figure 3:
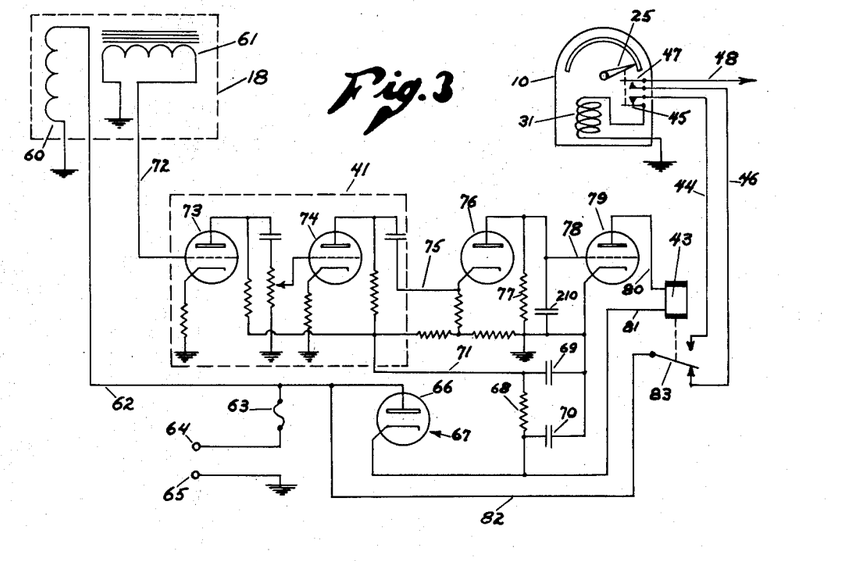
Figure 3 is a wiring diagram illustrating the electrical apparatus and connections employed in an electronic sensing apparatus responsive to changes in mutual inductance.

There is shown in Figure 3 the electrical circuits employed in a preferred form of the invention in which the sensing unit 18 is responsive to the changes in mutual inductance between two inductance coils produced by the moving of a vehicle into or out of the parking area. The sensing unit 18 in this form of the invention is preferably buried beneath the surface 14 of the roadway in the central portion of the parking area associated with the parking meter 10. While the sensing unit 18 is preferably buried beneath the surface of the roadway, the same may, if desired, be mounted upon the surface thereon, in which event the components of the sensing unit are made relatively thin and flat so as to reduce to the minimum the obstruction caused thereby.

In the form of the invention shown in Figure 3, the sensing unit 18 consists of two inductance coils, an exciter coil 60 and a pickup coil 61. The exciter coil 60 may comprise a substantial number of turns of suitably sized wire wound to a diameter of about six inches, and placed with its axis extended vertically. Pickup coil 61 is preferably formed as a multiple turn iron-cored inductance of small diameter and high impedance. In making the installation, the coil 61 is adjusted as to orientation to a position providing substantially no coupling between the coils 60 and 61 when there is no vehicle in the parking area.

The exciter coil 60 is connected, as shown at 62, through a suitable fuse 63 to a source of alternating current power, represented by the terminals 64 and 65. This source of power is also connected, as shown at 66, to a power rectifier 67, the output of which is filtered as by a resistance 68 and condensers 69 and 70 to provide on a buss 71 a direct potential suitable for use as a plate supply for the various vacuum tubes employed in the circuit to be described.

The pickup coil 61 is connected as indicated at 72 to the grid of a vacuum tube 73 which is connected in a conventional circuit with a second vacuum tube 74 to provide a two-stage resistance-coupled amplifier. The amplified output of the input signal appearing on the conductor 72 is applied as by a conductor 75 to a rectifier 76, and the rectified output is developed as a negative potential across a rectifier load resistance 77. This negative potential is applied as indicated at 78 to the grid of an output tube 79, the plate of which is connected as by means of conductors 80 and 81 through the coil of the relay 43 to the output of the power supply rectifier 67. The alternating current operating potential applied at terminal 64 is conveyed, as by conductor 82, to a movable contact 83 of the relay 43. The normally open and normally closed stationary contacts of the relay 43 are connected by conductors 44 and 46, respectively, to the limit switches 45 and 47 in the manner hereinbefore described.

The operation of the circuit just described may best be understood by assuming a set of operating conditions and tracing the sequence of operations which results from a change in those conditions. Assuming that the parking stall is vacant, substantially no signal is induced in the pickup coil 61 because of the minimum coupling between the exciter coil 60 and the pickup coil 61. The output of the amplifier 41 is therefore nearly zero, and the rectified voltage appearing across the rectifier load resistance 77 is of negligible value. The return end of this resistance is grounded, as shown, with the result that the grid of the output tube 79 is maintained substantially at ground potential. The cathode of that tube being grounded as shown, the tube draws a substantial plate current which energizes the relay 43 and closes the normally open contacts thereof so as to connect the supply conductor 82 to the conductor 44. Assuming that the parking meter is in its zero position, the circuit is interrupted at the limit switch 45 which is open in the zero position of the parking meter timing device.

If it now be assumed that a motorist parks a vehicle in the parking area, the magnetic materials used in the construction of the motor vehicle provide a considerable coupling between the coils 60 and 61 so as to now cause a voltage to be induced in the coil 61 and applied as an input to the amplifier 41. It has been found that the sensing unit arrangement described is substantially insensitive to small masses of metal, such as bolts, nuts, and such things which might normally be found on a roadway. However, the balance is upset sufficiently by the presence of a parked vehicle to produce a signal on the conductor 72 having a magnitude at least one hundred times as large as the signal appearing thereon when no vehicle is in the parking space. This signal is amplified in the amplifier 41 and rectified by the rectifier 76 to apply a substantial negative potential to the grid of the output tube 79, the amplification of the amplifier 41 being selected to produce a negative voltage at the grid of the tube 79 of sufficient magnitude to bias the tube 79 substantially to cutoff. This reduces to a negligible value the current flowing in the coil of the relay 43, and causes the relay to release and close its normally closed contacts.

After parking the vehicle, the motorist deposits his coin in the parking meter, causing the time indicator thereof to indicate the time paid for by the deposit of the coin. Should the vehicle remain parked after the expiration of the time paid for, the return of the indicating needle 25 to the zero position will close the limit switch 47 so as to complete a circuit extending from the supply conductor 82 through the normally closed relay contacts and by way of conductor 46, limit switch 47 and conductor 48 to the annunciator panel 49, and a indicate a violation of the parking ordinance.

If, on the other hand, the motorist removes his vehicle from the parking space before the expiration of the time paid for, the zero coupling balance between coils 60 and 61 is restored, causing the signal applied as an input to the amplifier 41 to fall substantially to zero. The grid of the output tube 79 shifts correspondingly in the positive direction to cause the tube 79 to draw plate current and energize the relay 43. This closes the normally open contacts of the relay 43, completing a power circuit extending from the conductor 82, through the relay contacts, and through conductor 44 and normally closed limit switch 45 to energize the resetting solenoid 31. Energization in the solenoid 31 winds the clock spring and returns the time indicating needle 35 to zero position at which point the limit switch 45 is opened to open the circuit to the solenoid 31.

Figure 4:
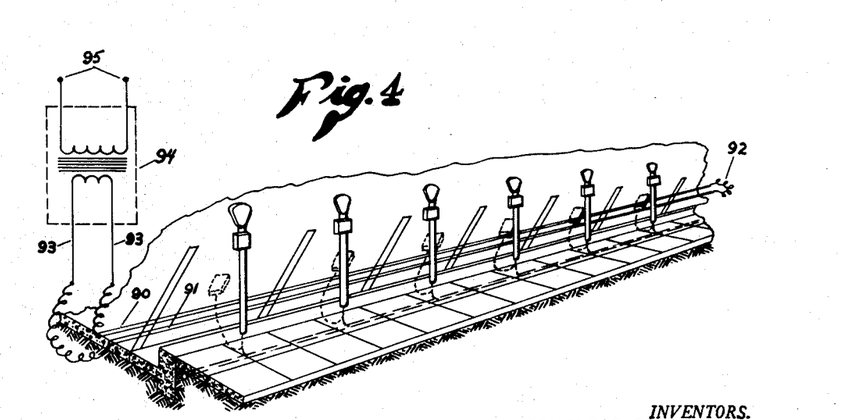
Figure 4 is a fragmentary perspective view illustrating an alternative method of installation of parking meters and showing a modified form of exciter device which may be used with the circuit shown in Figure 3.

The circuit arrangement illustrated and described with reference to Figure 3 may be used in a system such as is shown in Figure 4, employing an alternative construction of sensing unit 18. The sensing unit 18 which is to be used with the system shown in Figure 4, will be understood to include only the pickup coil 61. The excitation may be provided by a pair of parallel conductors or buss bars 90 and 91, either buried in the street or secured to the surface thereof. The outer ends of the buss bars 90 and 91 are interconnected, as shown at 92, and the inner ends are connected, as shown at 93, to the secondary winding of a low voltage transformer 94, the primary winding of which is connected, as represented at 95, to a suitable source of alternating current power.

The conductors 90, 91, 92, and 93 are made of extremely low resistance, and the secondary voltage developed by the transformer 94 may be of the order of a few volts so as to cause a substantial current to flow in the buss bars 90 and 91 without consuming an excessive amount of power. The interconnected buss bars 90 and 91 thus constitute a single turn coil for developing an exciting field in the same way as an exciting field is developed by the exciter coil 60. The pickup coil 61 of each of the sensing units 18 is so adjusted in its orientation as to bear a zero coupling relation to the single turn coil defined by the buss bars 90 and 91 when there is no vehicle parked in the parking area associated with that sensing unit. Except for this difference in the mode of supplying the exciting field, the arrangement shown in Figure 4 will be understood to operate in exactly the same way as has been described in reference to Figure 3.

Figure 5:
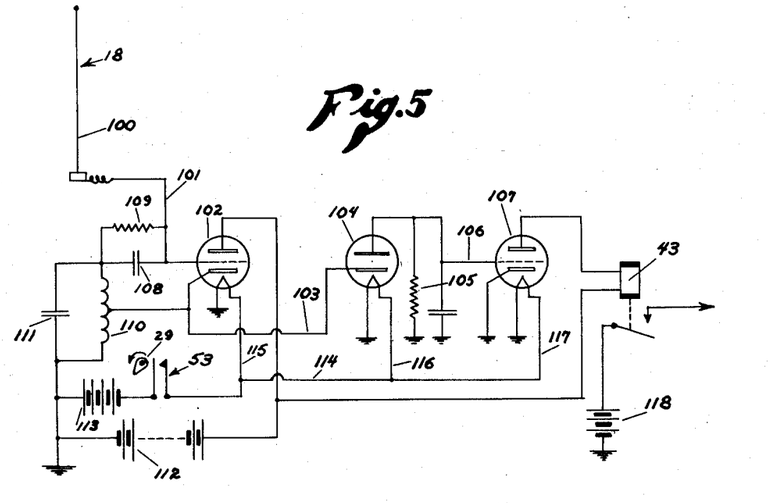
Figure 5 is a diagram similar to Figure 3, but illustrating the construction of a sensing apparatus which is responsive to changes in the capacity of an electrical surface.

In Figure 5 there is shown a sensing unit and control apparatus operating to sense and determine the presence or absence of a vehicle in the associated parking area through a change in the electrical capacitance of an electrical surface. In the form illustrated in Figure 5, the electrical surface may comprise an antenna 100 which is preferably mounted on the curb near the parking area so as to have its effective capacity to ground vary in accordance with whether a vehicle is parked in the parking area.

The antenna 100 is connected, as shown at 101, to the grid of a vacuum tube 102 which is connected in a conventional self-oscillating circuit of the Hartley type. The output signal generated by the operation of the oscillatory circuit is taken from the cathode of tube 102, and applied, as indicated at 103, to a rectifier 104 operating to develop across a load resistance 105, a direct potential which is negative with respect to ground. This negative potential is applied, as indicated at 106, to the grid of an output tube 107, in the plate circuit of which is connected the relay 43.

The apparatus is so adjusted as to make the oscillator 102 inoperative in the absence of a parked vehicle. This is accomplished through appropriate adjustment of the capacitance of the antenna 100 and the proper selection of grid condenser 108 and grid leak 109, used to connect the grid of the tube 102 to a tank circuit of the oscillator comprising a tank coil 110 and tank condenser 111. With a tank condenser having a capacity of 100 mmf. and a tank coil having an inductance of approximately 20 mh., it has been found that a grid leak resistance 109 of one megohm and a grid condenser 108 of 500 mmf. produces the desired type of operation.

The removal of a parked car from the parking area causes the oscillator 102 to drop out of operation, or at least to materially reduce the amplitude of the output. The balance of the circuit operates in exactly the same way as does the circuit illustrated and described with reference to Figure 3, the relay 43 being energized whenever the parking stall is vacant and being deenergized whenever a vehicle is parked adjacent the sensing unit 18.

It will be understood that the circuit shown in Figure 5 may be supplied with operating power from a commercial power source by using a power rectifier in the manner described with reference to Figure 3. The circuit is equally adapted, however, to battery operation and as an illustration of such arrangement of the apparatus, battery power supplies have been illustrated and shown in Figure 5. Such a battery installation may include a plate battery 112, one terminal of which is grounded and the other terminal of which is suitably connected to the anodes of the vacuum tubes 102 and 107, as shown. A second battery 113 for supplying current to energize the filaments of the vacuum tubes 102, 104 and 107 has one terminal grounded and the other terminal connected through the intermittently actuated momentary contact switch 53, and by way of conductors 114, 115, 116 and 117 to the filaments of the individual vacuum tubes.

A separate battery 118 may be connected in circuit with the contacts of the relay 43 for energizing the solenoid 31.

It will be seen that the periodically operated momentary contact switch 53 operates to close the circuit energizing the filaments of the tubes 102, 104 and 107 momentarily for each revolution of the clutch member 29. During the times the switch 53 is open, the mechanism is inoperative, and the plate relay 43 is deenergized. The vacuum tubes 102, 104 and 107 employ light, quick-heating filaments, so that by closing the switch 53 for a brief period of time, the circuit may be placed in operation.

If a vehicle is parked in the parking stall, the oscillator 102 will go into oscillation at each momentary energization and the output tube 107 will be biased to cut off so that the relay 43 remains deenergized. However, should the parked vehicle be removed from the parking area, the next closing of the switch 53 will energize the filament circuits for the vacuum tubes without causing the oscillator 102 to go into oscillation. The resulting absence of a negative grid bias on the output tube 107 at the time that tube is energized will permit the tube to draw plate current and energize the relay 43 so as to complete the circuit to the resetting solenoid 31 and reset the parking meter to zero.

It will be seen that, by making the open circuit time of the switch 53 long with respect to the closed circuit time, the life of the battery 113 may be greatly prolonged. This also correspondingly prolongs the life of the plate battery 112 since no plate current is drawn by any of the vacuum tubes during the time their filament circuits are deenergized.

Figure 6:
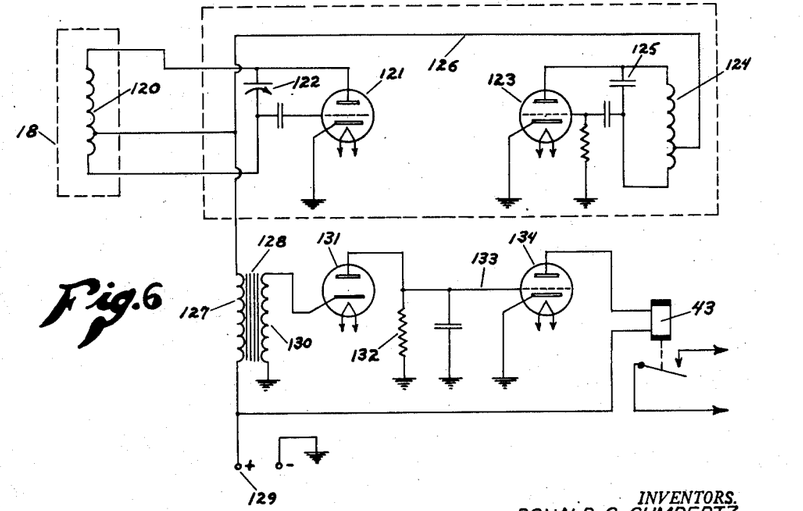
Figure 6 is a wiring diagram also similar to Figure 3, but illustrating a circuit which responds to changes in inductance to produce a change in the frequency of an alternating current.

In Figure 6, there is illustrated an electronic control apparatus which responds to a change in the inductance of a pickup coil by varying the frequency of an alternating current generated by the apparatus. As is shown in Figure 6, the sensing unit 18 comprises a pickup coil 120 which is tapped as is shown and connected as the tuning inductance of a conventional oscillator circuit employing an oscillator tube 121. The coil 120 is shunted by a variable tuning condenser 122 through adjustment of which the frequency generated by the oscillator may be varied as desired.

A second oscillator of like construction but operating at a fixed frequency employs a vacuum tube 123 connected to a tuning coil 124 shunted by a fixed tuning condenser 125. The output of the oscillator 123 is mixed with the output of the oscillator 121 by connecting a tap on the coil 124 to the tap on the coil 120, as by means of conductor 126. The mixed outputs of the two oscillators 121 and 123 are taken from the conductor 126 and applied to the primary winding 127 of a coupling transformer 128. The other terminal of the primary winding 127 is connected as indicated at 129 to a suitable source of plate supply potential which is applied to the anodes of the tubes 121 and 123 through the transformer winding 127 and through the tuning coils 120 and 124, respectively. A secondary winding 130 of the transformer 128 is connected through a rectifier 131 to a load resistance 132 so as to develop across the load resistance 132 a negative potential which is applied as indicated at 133 as a grid bias to an output tube 134. The plate relay 43 is connected in the anode circuit of the output tube 134.

The variable condenser 122 is adjusted with the parking area vacant to cause the oscillator 121 to generate a frequency which is substantially equal to the frequency generated by the oscillator 123. Under these conditions, the voltage developed across the rectifier load resistance 132 is of extremely low magnitude and the tube 134 draws plate current so as to energize the plate relay 43. However, when a vehicle is moved into the parking area, the effective inductance of the coil 120 is changed by reason of the large mass of magnetic material positioned near thereto. This change in inductance upsets the equality between the frequencies generated by the two oscillators so as to produce across the rectifier load resistance 132 a negative potential of sufficient magnitude to bias the output tube 134 to cut off and deenergize the relay 43. The relay 43 is operatively connected with the resetting solenoid 31 in a manner identical to that hereinbefore described.

Figure 7:
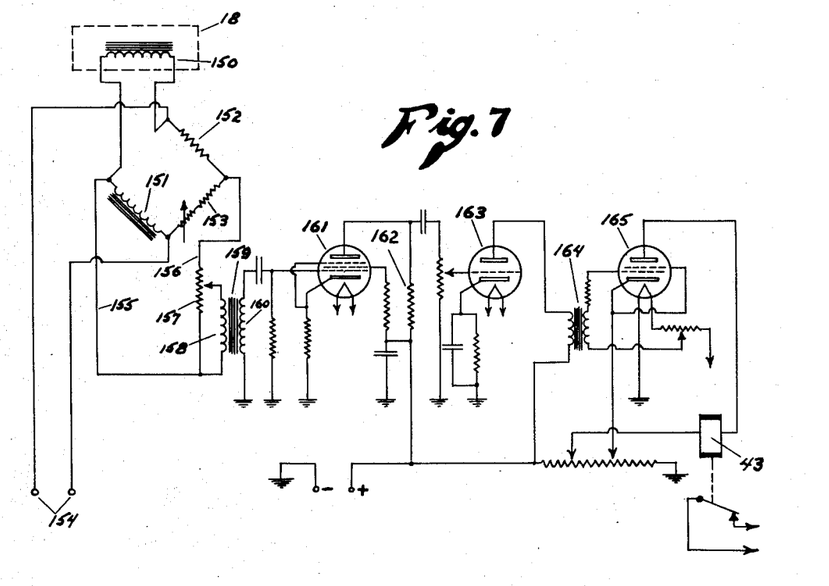
Figure 7 is an electrical circuit similar to Figure 6, but illustrating the use of the change in inductance for changing the balance conditions in an inductance bridge.

In Figure 7, there is illustrated an alternative inductance-responsive circuit in which a change in the inductance of a pickup coil 150, resulting from the removal of a parked vehicle from the parking area, is used to change the balance conditions of an inductance bridge comprising a fixed inductance 151 and resistance legs 152 and 153. The two inductances 150 and 151 and the two resistances 152 and 153 are connected in a Wheatstone bridge circuit which is energized by alternating current at diagonally opposite corners of the bridge, as by means of power from a commercial source such as is represented by the terminals 154.

All or a portion of the resistance leg 153 is made variable so that the bridge may be balanced for the condition when no vehicle is in the parking stall. When the bridge is so balanced, the potential measured across the remaining diagonal of the bridge is substantially zero. The balance of the bridge will be upset by the parking of a vehicle in the stall so as to produce between these diagonally opposite corners an alternating current signal which is applied by means of conductors 155 and 156 to an input potentiometer 157. A movable tap on the potentiometer 157 is connected to apply a selected portion of the output signal to the primary winding 158 of an input transformer 159, the secondary 160 of which is connected by conventional circuit arrangements to a pentode amplifier tube 161. The amplified output signal appears across a plate load resistance 162 which may be coupled in a conventional fashion to the grid of a second amplifying tube 163. The second amplifying tube is transformer coupled, as indicated at 164, to the grid of a gas discharge tube 165. The plate relay 43 is connected in the anode circuit of the gas discharge tube 165.

The circuit shown in Figure 7 and just described operates in a manner opposite to that characterizing the circuits previously described in that the resetting of the parking meter results from a deenergization of the plate relay 43 as distinguished from operation following energization of the relay as is characteristic of the previously described circuits. It will be seen that, in the absence of a vehicle parked in the parking stall, the signal which is applied to the grid of the gas discharge tube 165 will be of negligibly small value with the result that the gas discharge tube will remain in its non-conductive condition and the relay 43 will be deenergized. When a vehicle is parked in the parking stall, the balance of the bridge is upset and a substantial signal is applied to the grid of the gas discharge tube 165, triggering the tube and causing the same to draw anode current and energize the relay 43.

Because of the reversal of the operating characteristics, the resetting solenoid 31 is connected in circuit with the normally closed contacts of the relay 43 so as to be energized in response to deenergization of the relay 43 when a parked vehicle is removed from the parking area.

Figure 9:
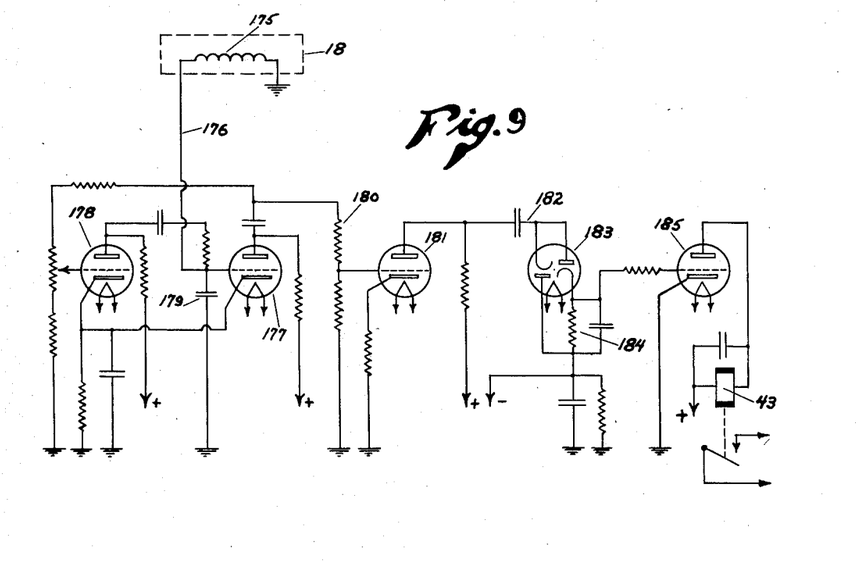
Figure 9 is an electrical circuit similar to Figure 7, but illustrating the construction and operation of a sensing device in which a change of inductance is used to change the "Q" of a tuned circuit.

In Figure 9, a still further modified form of the invention is illustrated for sensing the presence or absence of a parked vehicle by the resulting change in the inductance of a pickup coil 175. The pickup coil 175 is connected as shown at 176 to the grid of a vacuum tube 177 which, in association with a vacuum tube 178, is connected in a conventional multivibrator circuit. The circuit constants are so selected as to make the multivibrator self-oscillating when a vehicle is parked in the parking stall.

The pickup coil 175 is shunted by a fixed condenser 179, and the "Q" of this circuit is changed sufficiently by the departure of a vehicle from the parking area to cause the multivibrator circuit to stop oscillating.

With this arrangement the oscillator 177, 178 generates an output signal only during the presence of a vehicle in the parking area. This output signal is applied, as indicated at 180, to a vacuum tube amplifier 181, and the amplified output signal is applied, as indicated at 182, to a rectifier 183 serving to produce across a load resistance 184 a direct potential which, by virtue of its coupling to the grid of a vacuum tube 185, serves to control the operation of the vacuum tube. As is characteristic of the systems hereinbefore described, the arrangement is such as to cause the tube 185 to draw plate current and energize the relay 43 connected in the anode circuit thereof when a parked vehicle is removed from the parking area.

Figure 8:
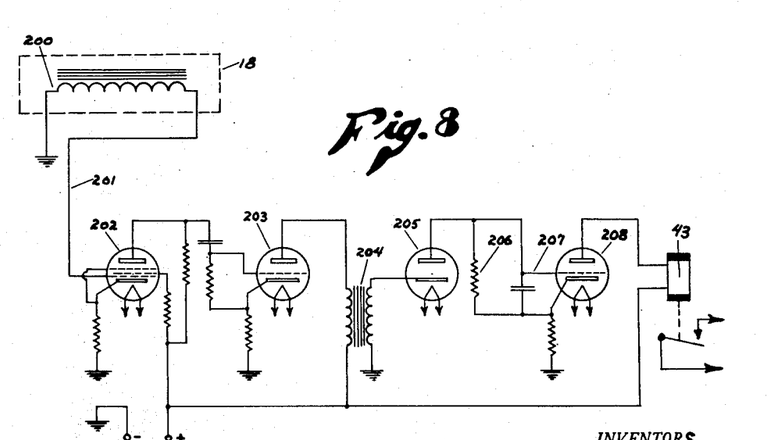
Figure 8 is a wiring diagram illustrating the construction and mode of operation of a sensing apparatus which is responsive to a change in the orientation of the earth's magnetic field, such change resulting from the movement of a vehicle into or out of the parking area associated with the parking meter.

The circuit which is illustrated in Figure 8 employs as a sensing unit 18, a multiturn iron cored pickup coil 200. The magnetic flux induced in the iron core of the coil 200 by the earth's magnetic field is caused to change in magnitude by the distortion of the earth's magnetic field resulting from the movement of a vehicle into or out of the parking area in which the sensing unit is placed. This change in magnitude of flux induces a momentary potential which is amplified in a high-gain, two-stage amplifier employing vacuum tubes 202 and 203. The amplified output is coupled as by a coupling transformer 204 to a rectifier 205 which operates to produce across a load resistance 206 a biasing potential which is applied as indicated at 207 to the grid of an output tube 208. The plate relay 43 is connected in the anode circuit of the output tube 208.

It will be recognized that the polarity of the momentary voltage applied to the input of the amplifier 202—203 will depend upon whether a vehicle is being moved into the parking area or being removed therefrom. The position of the coil 200 or the connections thereto are so adjusted as to cause a negative potential to be developed across the rectifier load resistance 206 when the vehicle is being removed from the parking space so as to control the output tube 208 and plate relay 43 in the same manner as has been hereinbefore described. When a vehicle is being moved into the parking space, the polarity of the momentary voltage developed on conductor 207 is opposite to that just assumed, and accordingly applies to the rectifier 205 a signal of opposite polarity. This signal is of the wrong polarity to cause current to flow in the rectifier circuit, and the relay 43 is therefore not responsive to movements of vehicles into parking position, and responds only to the removal of vehicles from the parking space.

In the description of Figure 2, reference was made to a time delay means 42. Such a time delay means is included in each of the circuits above described. In Figure 3, for example, the time delay is obtained by a condenser 210 connected in shunt with the cathode load resistance 77.

The time constant of the resistance 77 and condenser 210 is made relatively long so as to maintain the bias voltage on the grid of the output tube 79 for an appreciable length of time after the signal induced in the pickup coil 61 falls substantially to zero. As the condenser 210 slowly discharges through the plate load resistance 77, the grid of the tube 79 gradually shifts in the positive direction and eventually the tube 79 draws plate current of sufficient magnitude to energize the relay 43. By appropriate adjustment of the electrical values of the resistance 77 and condenser 210, substantially any desired time delay may be obtained. Ordinarily, this delay should be of the order of magnitude of ten seconds to insure that the parking meter is not reset until the vehicle is actually removed from the parking space, thus avoiding faulty operation of the device due to momentary changes in the coupling between the exciter coil 60 and the pickup coil 61.

As will be seen from an inspection of the drawings, a similar time delay may be incorporated into each of the circuits described herein by connecting a condenser of suitable capacity in parallel with the load resistance for each of the rectifiers.

In each of the various forms of the invention described herein, the vacuum tube amplifiers, rectifiers, and output tubes may be replaced by a conventional magnetic amplifier by using as the relay 43 a device which is designed to operate on alternating current. Such an arrangement is illustrated diagrammatically in Figure 10 wherein the sensing unit 18 is shown as connected to the input of a magnetic amplifier 41', the output of which is connected to the relay 43.

Figure 10:
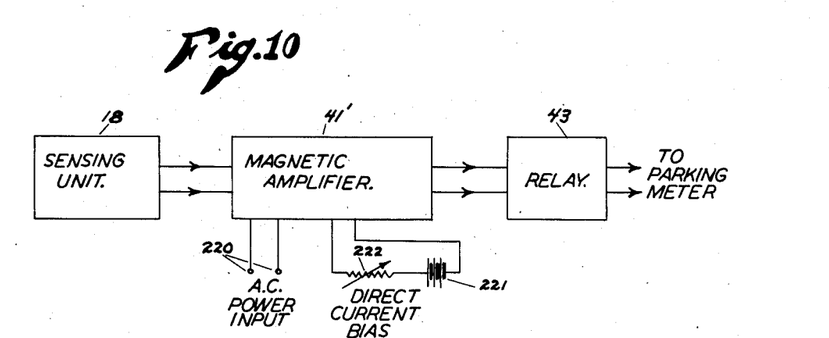
Figure 10 is a block diagram illustrating the use of a magnetic amplifier in the sensing and control apparatus.

The magnetic amplifier 41' may comprise any of the conventional variations of the well known saturable reactor. For example, alternating current power may be supplied to the amplifier from terminals 220, and a controlled fraction of the voltage so applied is used to control the operation of the relay 43. The output of the sensing unit 18 serves to control the magnitude of such fraction by varying the degree of saturation of the magnetic core of the amplifier. Zero signal operating levels are established by the direct current bias supplied from a battery 221 through a variable resistance 222.

From the foregoing, it will be observed that this invention provides a parking meter which includes an electronic apparatus operating to sense the departure of a vehicle from the parking area or stall associated with the parking meter, and operating in response to that determination to reset the parking meter to zero. This, of course, makes it necessary for the next motorist parking a vehicle in that parking area to insert the appropriate coin in the parking meter even though a considerable amount of unexpired time would remain on the parking meter but for the automatic resetting thereof. It will be seen that by so resetting the parking meters whenever the parking stall is vacated, the amount of revenue which may be collected by the parking meters can be substantially increased.

This invention embraces broadly the concept of sensing through electronic means whether the parking area associated with the parking meter is occupied by a parked vehicle. In the various forms of the invention illustrated and described herein, there have been disclosed electronic sensing mechanisms responsive to changes in the mutual inductance between two related inductance coils, to changes in capacitance of an electrical circuit, to changes in inductance in an inductance coil used to change the frequency of an alternating current or unbalance an inductance bridge circuit or change the "Q" of a tuned circuit, and to changes in the orientation of the earth's magnetic field; all such changes resulting from the departure of a vehicle from the parking area.

Attention is directed particularly to the arrangement of a group of such parking meters in a parking meter system so as to indicate at a suitably located supervisory station any and all violations of the parking ordinances, as well as indicating the total number of operations of the parking meters comprising the system.

It will also be noted from the foregoing that the apparatus of this invention obviates the difficulties attendant upon the necessity of winding the spring motors used in the timing mechanisms of parking meters. In the present invention, the winding of the spring motor is accomplished automatically upon each automatic resetting of the time indicator.

Attention is also directed to the use of the periodically operated momentary contact mechanism for repeatedly energizing the sensing apparatus for short periods of time so as to materially extend the life of batteries used in a battery powered installation.

While the preferred embodiments of each of the various aspects of this invention have been illustrated and described herein, the invention is not to be limited to the details shown and described except as defined in the appended claims.

We claim:

1. In a parking meter, the combination of: a time indicator movable from a zero position to an operative position in response to manually movable means for indicating unexpired time; timing means coacting with said indicator to move the same to said zero position upon expiration of said time, said timing means including a driving spring; resetting means operable upon actuation at any time to move said indicator to said zero position; sensing means responsive to the presence of a vehicle in a given parking area for producing a signal representing the departure of said vehicle from said area; electrical means connected between said sensing means and said resetting means and operably responsive to said signal for actuating said resetting means; a source of power for energizing said electrical means; intermittently operated switch means coupled to said timing means for operation thereby connected in circuit between said source and said electrical means for periodically momentarily energizing said electrical means; and time delay means coacting with said electrical means for delaying actuation of said resetting means until a predetermined time after production of said signal.

2. In a parking meter, the combination of: a time indicator movable from a zero position to an operative position in response to manually movable means for indicating unexpired time; timing means coacting with said indicator for moving the same toward said zero position at a rate equal to the rate of expiration of said time, said timing means including a driving spring; resetting means operable upon actuation at any time to move said indicator to said zero postion; sensing means responsive to the presence of a vehicle in a given parking area for producing a signal representing the departure of said vehicle from said area; electrical means connected between said sensing means and said resetting means; rewind means connected to said timing means for winding said driving spring; and a connection between said rewind means and said resetting means; said electrical means being operably responsive to said signal from said sensing means for simultaneously actuating said resetting means and said rewind means to return said time indicator to a zero position and rewind said driving spring.

3. A resetting control mechanism for parking meters according to claim 2 in which said sensing means comprises a pickup coil disposed in a position relatively adjacent to a vehicle parked in a given parking area, and an exciting coil disposed relatively adjacent to said pickup coil to induce therein a substantial alternating potential when a vehicle is parked in said given parking area, said exciting coil being so oriented with respect to said pickup coil as to provide minimum intercoupling therebetween in the absence of said vehicle; and in which said electrical means is responsive to a material reduction in said alternating potential induced in said pickup coil and resulting from the departure of said vehicle from said area.

4. A resetting control mechanism for parking meters according to claim 2 in which said sensing means comprises an inductance coil disposed in a position relatively adjacent to a vehicle parked in a given parking area, said coil having a given self-inductance when said vehicle is parked in said area, and a measurably different self-inductance when said vehicle is removed from said area; and in which said electrical means includes an oscillatory circuit containing said inductance coil for generating a control potential, said oscillatory circuit being responsive to a change in said self-inductance to produce a change in said control potential; and in which said electrical means also includes an actuating means responsive to said change in said control potential for actuating said power operated means upon the departure of said vehicle from said area.

5. A resetting control mechanism for parking meters according to claim 2 in which said sensing means comprises an inductance coil disposed in a position relatively adjacent to a vehicle parked in a given parking area, said coil having a given self-inductance when said vehicle is parked in said area, and a measurably different self-inductance when said vehicle is removed from said area; and in which said electrical means includes an oscillatory circuit for generating an alternating control potential and containing said inductance coil as a frequency determining element thereof, said oscillatory circuit being responsive to a change in said self-inductance to produce a change in the frequency of said control potential; and in which said electrical means also includes an actuating means responsive to said change in the frequency of said control potential for actuating said power operated means upon the departure of said vehicle from said area.

6. A resetting control mechanism for parking meters according to claim 2 in which said sensing means comprises an inductance coil disposed in a position relatively adjacent to a vehicle parked in a given parking area, said coil having a given self-inductance when said vehicle is parked in said area, and a measurably different self-inductance when said vehicle is removed from said area; and in which said electrical means includes an inductance bridge circuit containing said inductance coil; and in which said electrical means also includes an actuating means responsive to changes in the balance of said bridge circuit for actuating said power operated means upon the departure of said vehicle from said area.

7. A resetting control mechanism for parking meters according to claim 2 in which said sensing means comprises a pickup coil wound about a core of magnetic material disposed in a position relatively adjacent to a vehicle parked in a given parking area; and in which said electrical means is responsive to a potential induced in said pickup coil and resulting from a change in the magnetic flux induced in said core by the earth's magnetic field, said change resulting from the change in orientation of the earth's magnetic field at the location of said pickup coil caused by the departure of said vehicle from said area.

8. A resetting control mechanism for parking meters according to claim 2 in which said electrical means includes a magnetic amplifier for amplifying said signal, and an actuating means responsive to the amplified signal for actuating said power operated means.

9. In a parking meter, the combination of: a time indicator movable from a zero position to an operative position in response to manually movable means for indicating unexpired time; timing means coacting with said indicator to move the same to said zero position upon expiration of said time; resetting means operable upon actuation at any time to move said indicator to said zero position; sensing means responsive to the presence of a vehicle in a given parking area for producing a signal representing the departure of said vehicle from said area; electrical means connected between said sensing means and said resetting means and operably responsive to said signal for actuating said resetting means; a source of power for energizing said electrical means; and intermittently operated switch means coupled to said timing means for operation thereby connected in circuit between said source and said electrical means for periodically momentarily energizing said electrical means.

10. In a parking meter, the combination of: a time indicator movable from a zero position to an operative position in response to manually movable means for indicating unexpired time; timing means coacting with said indicator to move the same to said zero position upon expiration of said time; resetting means operable upon actuation at any time to move said indicator to said zero position; sensing means responsive to the presence of a vehicle in a given parking area for producing a signal representing the departure of said vehicle from said area; electrical means connected between said sensing means and said resetting means and operably responsive to said signal for actuating said resetting means; and time delay means coacting with said electrical means for delaying actuation of said resetting means until a predetermined time after production of said signal.

11. In a resetting control mechanism for parking meters having a time indicator movable from a zero position to an operative position in response to manually movable means for indicating unexpired time, and including timing means coacting with said indicator to move the same to said zero position upon expiration of said time, and said timing means including a driving spring, the combination of: power operated means operable upon actuation at any time to move said indicator to said zero position; sensing means responsive to the presence of a vehicle in a given parking area for producing a signal representing the departure of said vehicle from said area; electrical means connected between said sensing means and said power operated means and operably responsive to said signal for actuating said power operated means to thereby reset said time indicator to said zero position; means connected between said power operated means and said timing means for winding said driving spring in response to actuation of said power operated means; a source of power for energizing said electrical means; intermittently operated switch means coupled to said timing means for operation thereby connected in circuit between said source and said electrical means for periodically momentarily energizing said electrical means; and time delay means coacting with said electrical means for delaying actuation of said power operated means until a predetermined time after production of said signal.

12. In a resetting control mechanism for parking meters having a time indicator movable from a zero position to an operative position in response to manually movable means for indicating unexpired time, and including timing means coacting with said indicator for moving the same toward said zero position at a rate equal to the rate of expiration of said time, and said timing means including a driving spring, the combination of: power operated means operable upon actuation at any time to move said indicator to said zero position; sensing means responsive to the presence of a vehicle in a given parking area for producing a signal representing the departure of said vehicle from said area; electrical means connected between said sensing means and said power operated means; rewind means connected to said timing means for winding said driving spring; a connection between said rewind means and said power operated means; said electrical means being operably responsive to said signal from said sensing means for simultaneously actuating said power operated means and said rewind means to return said time indicator to a zero position and rewind said driving spring.

13. In a resetting control mechanism for parking meters having a time indicator movable from a zero position to an operative position in response to manually movable means for indicating unexpired time, and including timing means coacting with said indicator to move the same to said zero position upon expiration of said time, the combination of: power operated means operable upon actuation at any time to move said indicator to said zero position; sensing means responsive to the presence of a vehicle in a given parking area for producing a signal representing the departure of said vehicle from said area; electrical means connected between said sensing means and said power operated means and operably responsive to said signal for actuating said power operated means to thereby reset said time indicator to said zero position; a source of power for energizing said electrical means; and intermittently operated switch means coupled to said timing means for operation thereby connected in circuit between said source and said electrical means for periodically momentarily energizing said electrical means.

14. In a resetting control mechanism for parking meters having a time indicator movable from a zero position to an operative position in response to manually movable means for indicating unexpired time, and including timing means coacting with said indicator to move the same to said zero position upon expiration of said time, the combination of: power operated means operable upon actuation at any time to move said indicator to said zero position; sensing means responsive to the presence of a vehicle in a given parking area for producing a signal representing the departure of said vehicle from said area; electrical means connected between said sensing means and said power operated means and operably responsive to said signal for actuating said power operated means to thereby reset said time indicator to said zero position; and time delay means coacting with said electrical means for delaying actuation of said power operated means until a predetermined time after production of said signal.

DONALD G. GUMPERTZ.
RUSSEL C. ALEXANDER.

References Cited in the file of this patent

UNITED STATES PATENTS

| Number | Name | Date |
| --- | --- | --- |
| 1,950,741 | Nein et al. | Mar. 13, 1934 |
| 2,074,443 | Walpole | Mar. 23, 1937 |
| 2,152,577 | Weaver | Mar. 28, 1939 |
| 2,178,315 | Sweetland | Oct. 31, 1939 |
| 2,277,612 | Symington | Mar. 24, 1942 |
| 2,355,395 | Rubenstein | Aug. 8, 1944 |
| 2,386,942 | Edelman | Oct. 16, 1945 |
| 2,492,182 | Robinson | Dec. 27, 1949 |
| 2,623,933 | Allstadt | Dec. 30, 1952 |